United States Patent
Hager et al.

(10) Patent No.: US 11,922,747 B2
(45) Date of Patent: Mar. 5, 2024

(54) ACCESS CONTROL FOR PROPERTY MANAGEMENT

(71) Applicant: Chirp Systems, Inc., Richardson, TX (US)

(72) Inventors: Matthew Hager, Houston, TX (US); Chuong Le, Houston, TX (US); Evan Corl, Houston, TX (US); Jamie Hsu, Houston, TX (US)

(73) Assignee: CHIRP SYSTEMS, INC., Richardson, TX (US)

( * ) Notice: Subject to any disclaimer, the term of this patent is extended or adjusted under 35 U.S.C. 154(b) by 0 days.

(21) Appl. No.: 17/933,550

(22) Filed: Sep. 20, 2022

(65) Prior Publication Data

US 2023/0083819 A1 Mar. 16, 2023

Related U.S. Application Data

(63) Continuation of application No. 16/888,208, filed on May 29, 2020, now Pat. No. 11,455,854.

(60) Provisional application No. 62/890,063, filed on Aug. 21, 2019, provisional application No. 62/854,317, filed on May 29, 2019.

(51) Int. Cl.
*G07C 9/00* (2020.01)
*G06N 5/025* (2023.01)
*G06N 20/00* (2019.01)
*G06Q 50/16* (2012.01)
*G07C 9/22* (2020.01)
*G07C 9/27* (2020.01)

(52) U.S. Cl.
CPC ......... *G07C 9/00896* (2013.01); *G06N 5/025* (2013.01); *G06N 20/00* (2019.01); *G06Q 50/163* (2013.01); *G07C 9/22* (2020.01); *G07C 9/27* (2020.01)

(58) Field of Classification Search
CPC ........ G07C 9/00896; G07C 9/22; G07C 9/27; G06N 5/025; G06N 20/00; G06Q 50/163
See application file for complete search history.

(56) References Cited

U.S. PATENT DOCUMENTS 9,781,205 B2 * 10/2017 Batrouni ................. H04L 67/10
9,785,967 B1 * 10/2017 Vangell .............. G06Q 30/0246
9,923,879 B1 * 3/2018 Ziraknejad ............ H04L 63/107
9,961,507 B1 * 5/2018 Mendelson ........... H04W 4/029
(Continued)

*Primary Examiner* — Brian E Miller
(74) *Attorney, Agent, or Firm* — HAYNES AND BOONE, LLP

(57) ABSTRACT

Systems and methods herein provide for cloud-controlled access to an access point. A database maintains a plurality of user datasets and accounts for a plurality of access point management systems. Each account of the access point management systems includes identifies one or more access points associated with a property. Each user dataset includes user identifying information and user access information to one or more access points. A processor processes a request for access to the first access point. A rules engine accesses the database to identify a first user based on the request and a user equipment (UE) of the first user via the user identifying information, identifies a first of the access points based on a beacon transmitted by the first access point, retrieves the user access information, identifies access permission of the first user to the first access point, and grants access to the first user.

32 Claims, 13 Drawing Sheets

(56) References Cited

U.S. PATENT DOCUMENTS

| | | | |
|---|---|---|---|
| 10,009,868 B1* | 6/2018 | Reyes | G06Q 30/0261 |
| 10,230,522 B1* | 3/2019 | Roths | H04L 67/12 |
| 10,410,303 B1* | 9/2019 | Catalano | G06T 19/006 |
| 10,490,003 B2* | 11/2019 | Eyring | G07C 9/38 |
| 10,951,685 B1* | 3/2021 | Hager | H04L 67/06 |
| 11,631,291 B2* | 4/2023 | Schoenfelder | H04L 12/2807 |
| | | | 340/5.7 |
| 2012/0234907 A1* | 9/2012 | Clark | G06F 16/9554 |
| | | | 235/375 |
| 2013/0171967 A1* | 7/2013 | Ashour | G06F 3/04886 |
| | | | 455/410 |
| 2013/0221094 A1 | 8/2013 | Smith et al. | |
| 2013/0257589 A1* | 10/2013 | Mohiuddin | G08C 17/02 |
| | | | 340/5.61 |
| 2015/0194000 A1* | 7/2015 | Schoenfelder | G07C 9/00309 |
| | | | 340/5.61 |
| 2015/0371453 A1* | 12/2015 | Gallo | G06F 21/35 |
| | | | 340/5.65 |
| 2016/0055698 A1* | 2/2016 | Gudmundsson | G07C 9/32 |
| | | | 340/5.52 |
| 2016/0078699 A1* | 3/2016 | Kalb | G07C 9/00571 |
| | | | 340/5.6 |
| 2016/0117785 A1* | 4/2016 | Lerick | G06Q 50/163 |
| | | | 705/305 |
| 2016/0246892 A1* | 8/2016 | Murrah | G06K 19/0723 |
| 2016/0314546 A1* | 10/2016 | Malnati | H04W 12/06 |
| 2017/0084098 A1* | 3/2017 | Rabinowitz | G07C 9/27 |
| 2017/0245110 A1* | 8/2017 | Ruiz | H04W 4/023 |
| 2018/0005143 A1* | 1/2018 | Camargo | H04W 12/06 |
| 2018/0246774 A1* | 8/2018 | Byrne | G06Q 50/14 |
| 2018/0308100 A1* | 10/2018 | Haukioja | G06N 20/00 |
| 2018/0308303 A1* | 10/2018 | Esposito | H04W 4/023 |
| 2018/0350170 A1* | 12/2018 | Wang | G06F 1/3231 |
| 2019/0156444 A1* | 5/2019 | Targownik | G06Q 50/163 |
| 2019/0164240 A1* | 5/2019 | Barbara | G06F 16/909 |
| 2019/0236877 A1* | 8/2019 | Scoggins | G07C 9/28 |
| 2020/0021588 A1* | 1/2020 | Wittrock | H04L 9/3239 |
| 2020/0027038 A1* | 1/2020 | Oliver | G06Q 10/02 |
| 2020/0160638 A1* | 5/2020 | Wang | G07C 9/215 |
| 2020/0286194 A1* | 9/2020 | Li | G06Q 40/12 |
| 2020/0380808 A1* | 12/2020 | Hager | G07C 9/00896 |
| 2021/0027562 A1* | 1/2021 | Kennedy-Foster | H04W 12/08 |
| 2021/0065319 A1* | 3/2021 | Moufarrige | G06Q 10/0631 |
| 2021/0134100 A1* | 5/2021 | LaRovere | G07C 9/00174 |
| 2021/0174617 A1* | 6/2021 | Goldfarb | G07C 9/00896 |
| 2021/0224934 A1* | 7/2021 | Williams | G06N 20/00 |
| 2021/0232983 A1* | 7/2021 | Camargo | H04L 63/108 |
| 2021/0304542 A1* | 9/2021 | Valder | G07C 9/23 |
| 2021/0319639 A1* | 10/2021 | Ho | G06F 21/31 |
| 2021/0390811 A1* | 12/2021 | Learmonth | H04L 63/0442 |
| 2021/0407023 A1* | 12/2021 | Brophy | G06Q 50/163 |
| 2022/0130190 A1* | 4/2022 | Julia | G07C 9/00571 |

* cited by examiner

ACCESS CONTROL FOR PROPERTY MANAGEMENT

CROSS REFERENCE TO RELATED APPLICATIONS

This application is a continuation of U.S. patent application Ser. No. 16/888,208, filed May 29, 2020, the entire disclosure of which is hereby incorporated herein by reference. U.S. patent application Ser. No. 16/888,208, filed May 29, 2020, claims the benefit of the filing date of, and priority to, U.S. patent application Ser. Nos. 62/890,063, filed Aug. 21, 2019, and 62/854,317, filed May 29, 2019, the entire disclosures of which are hereby incorporated herein by reference.

BACKGROUND

Property owners are generally entitled to do as they wish with their property. For example, a person or an organization may own a residential building that may be leased to another (i.e., a lessee) for a fee. The lessee may then enter and use the property according to the terms of the lease. When the property involves a single lessee, this situation may be relatively easy to control in terms of access. However, in properties involving multifamily housing units, such as apartment buildings, and other complex rentable properties, such as car rental agencies, access control becomes increasingly complex. And, access control is a prominent concern among property owners as the property owners generally do not want unauthorized parties gaining access to their properties and using their properties free of charge, causing damage to their properties, etc.

SUMMARY

Systems and methods herein provide for cloud-controlled access to an access point. In one embodiment, a cloud-based computing system comprises a database operable to maintain accounts for a plurality of access point management systems, and to maintain a plurality of user datasets. Each account of the access point management systems identifies one or more access points associated with a property (e.g., one of a plurality of access points from a first of a plurality of multifamily housing constructions). Each user dataset includes user identifying information and user access information to one or more of the access points (e.g., lease information pertaining to the access points available to a user and the duration of the access to the access points). The system also includes a processor to process a request for access to the first access point. A rules engine that accesses the database to identify a first user based on the request and a user equipment (a "UE", such as a pre-programmed fob, a self-provisioning fob, or a smart phone) of the first user via the user identifying information, identifies a first of the access points based on a beacon transmitted by the first access point, retrieves the user access information, identifies access permission of the first user to the first access point, and grants access to the first user. Alternatively or additionally, the access point may include signage with various types of information (e.g., QR codes) that a user may use to obtain a grant to the access point. In this regard, the UE itself may transmit to the cloud computing system 10 and that the terms "beacon" and "transmit" may be used interchangeably with respect to the UE and the access point regarding communication with the cloud computing system.

In one embodiment, the processor is further operable to process another request for access to the first access point. And, the rules engine is further operable to access the database to identify a second user based on the other request and a UE of the second user via the user identifying information, to identify the first access point based on the beacon transmitted by the first access point, to retrieve the user access information, to identify access permission of the second user to the first access point, and to deny access to the second user.

In another embodiment, the processor is further operable to process an alternate request for access from the UE of the second user, to extract access credentials from the alternate request, to process the access credentials through the rules engine. The rules engine is further operable to overturn access denial to the second user based on the access credentials. And, the processor is further operable to grant access to the second user in response to the overturned access denial. For example, while the second user may be denied ingress/egress through the access point, the second user may still need access to the property, such as for repairs, maintenance, etc. Thus, if the second user is not authorized typical access, the second user may still gain ingress/egress access to the access point via secondary considerations.

In another embodiment, the processor is further operable to process another request for access to the first access point. And, the rules engine is further operable to access the database to identify a second user based on the other request and a UE of the second user via the user identifying information, to identify the first access point based on the beacon transmitted by the first access point, to retrieve the user access information, to determine that the second user is authorized access to the first access point based on guest access information input to the database from the first user. For example, in this embodiment, the second user may be a guest that is authorized by the first user to visit the premises of the first user.

In some embodiments, the processor is further operable to log access attempts. In some embodiments, the rules engine includes a machine learning module. For example, the user identifying information may include a previously recorded image of the first user. And, the request may include an image of the user recorded near a time of the request. In this regard, the machine learning module may be operable to verify an identity of the first user based on the previously recorded image of the first user and the image of the user recorded near a time of the request.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

Figure 1:
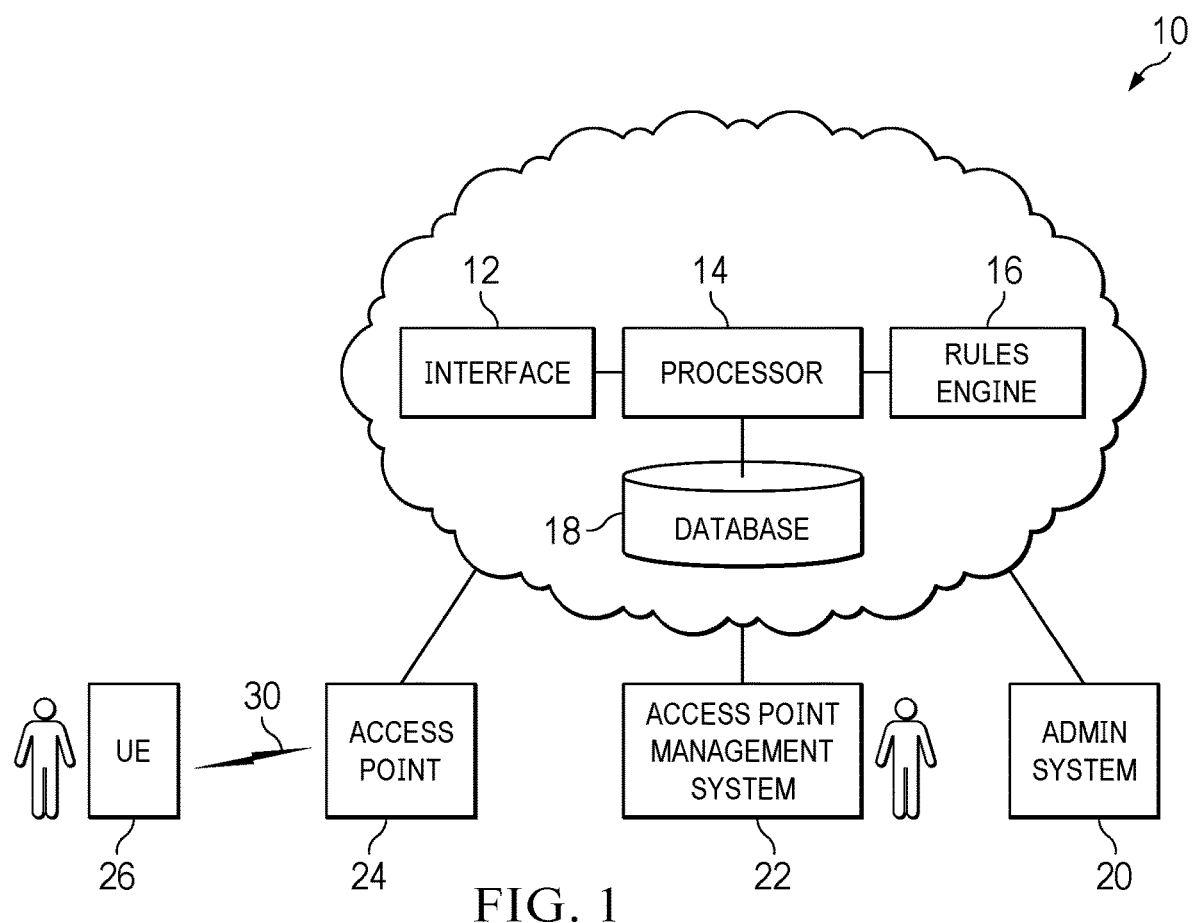
FIG. 1 is a block diagram of an exemplary cloud computing system for granting access to property

FIG. 1 is a block diagram of an exemplary cloud computing system 10 for granting access to property. The cloud computing system 10 includes a network interface 12, a database 18, a processor 14, and a rules engine 16. The database 18 is operable to maintain accounts for a plurality of access point management systems 22-1-22-N (where the reference "N" indicates an integer greater than or equal to "1" and not necessarily equal to any other "N" reference designated herein), and to maintain a plurality of user datasets 28-1-28-N, as illustrated in FIG. 2.

Figure 2:
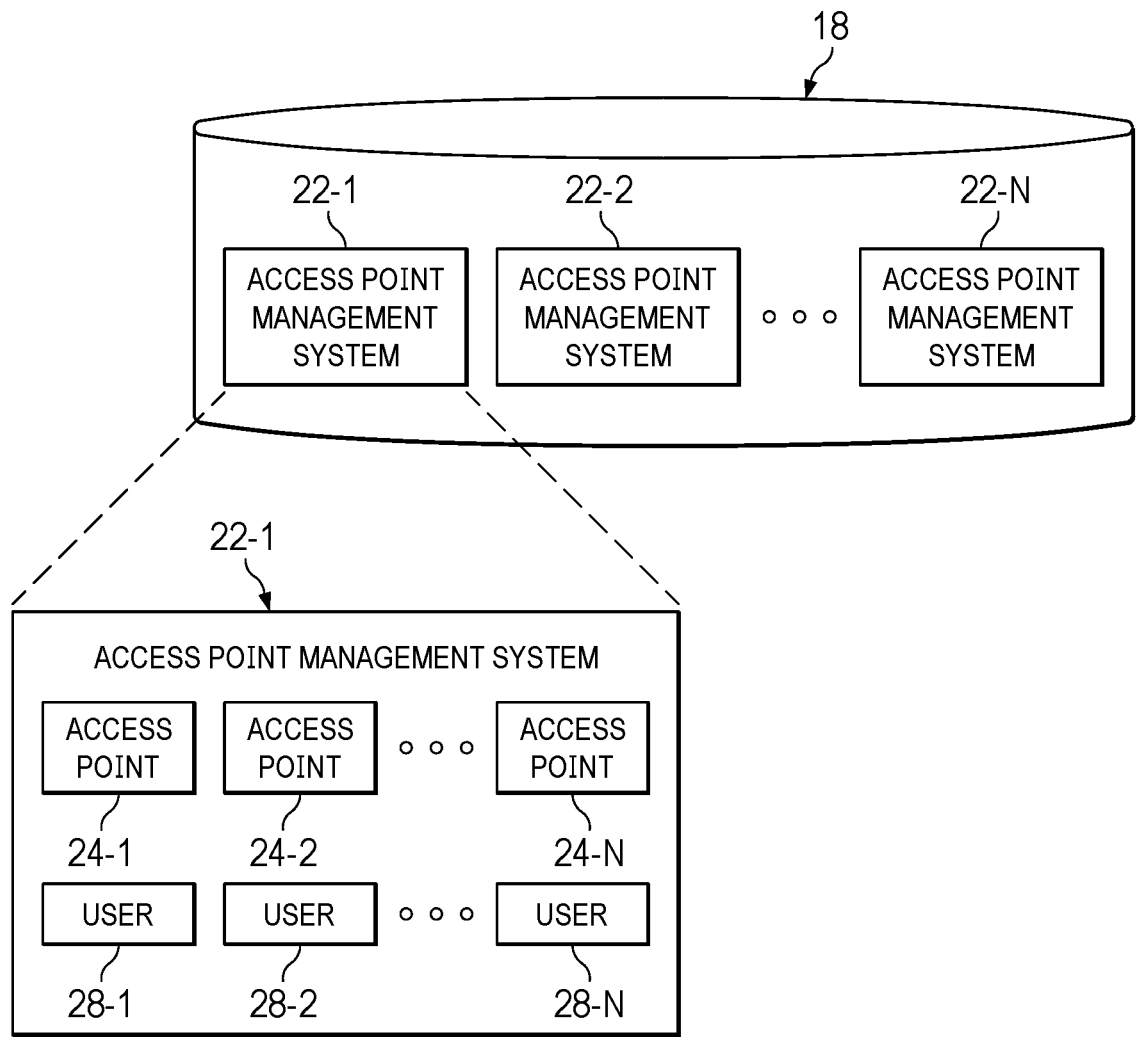
FIG. 2 is a block diagram of an exemplary database of the system of FIG. 1.

Each account of the access point management systems 22 identifies one or more access points 24-1-24-N associated with a property (see e.g., FIG. 2). For example, a property may have one or more designated ingress/egress points through which users may enter/exit property. In many instances, property managers wish to control these entrance/exits such that people who do not belong on the property can be prevented from gaining access to the property (e.g., trespassers, vandals, and various other nefarious actors). An access point management system 22 may allow a property owner and/or manager to subscribe to a service and establish an account that links the access points of that property to the subscription. These access points 24 may then be monitored by the cloud computing system 10 such that accesses to the property may be granted to authorized users.

In some embodiments, the access point management system 22 may also allow a property owner and/or manager to "whitelist" roles (e.g., resident, guest, staff, etc.) which can have access to each access point 24. In this regard, the access point management system 22 may also designate certain hours which these whitelisted roles have access to that access point 22. To illustrate, residents and guests may only have access to a clubroom on a property between the hours of 8 am and 10 pm, but staff may have access to the access point 22 on an unlimited basis (while they are employed by the property).

In this regard, each user dataset includes user identifying information (e.g., name, date of birth, personal identification number or "PIN", an image of the user, etc.) and user access information (collectively the users 28-1-28-N in the account of the access point management system 22 of the database 18) to one or more access points 24. The user access information may include lease information pertaining to the access points 24 available to a user. For example, a user may have entered into a lease agreement which allows the user to enter and use a property of another. The lease agreement may include a term or duration in which the user is allowed to enter and use the property. The lease information may be retained in the account of the access point management system 22 in the database 18 to assist in the automation of access point grants.

An administrator of the cloud computing system 10 may manage the database 18 and any subscription/accounts maintained therein. For example, the administrator through an administration system 20 that is communicatively coupled to an access point management system 22 via the cloud computing system 10 to manage the account thereof. In this regard, the administrator 20 may input the lease information, user information, access point information, etc. associated with the property of the access point management system 22 into the database 18.

The cloud computing system 10 may also include a processor 14 operable to implement a rules engine 16. The rules engine 16 may develop and/or employ rules on the information input by the administrator 20 to ensure that access to various access points 24 are properly granted to users. In this regard, the processor 14 may be operable to process a request for access to an access point 24 by a user equipment (UE) 26 to determine whether the user should be granted ingress/egress to the access point 24. Examples of the UE 26 include smart phones, mobile computing devices (e.g., tablet computers, laptop computers, etc.), preprogrammed fobs, self-provisioning fobs, and the like.

The rules engine 16 may be operable to access the database 18 to identify the user based on the request and a UE 26 via the user identifying information (e.g., part of the user dataset 28). The rules engine 16 may then identify the access point 24 based on a beacon (e.g., an RF signal, a Bluetooth signal, NFC signaling, signage with QR codes, etc.) transmitted by the access point 24, retrieve the user access information, identify access permission of the user to the access point 24, and grant access to the user. For example, the access point 24 may transmit a beacon 30 that the UE 26 detects as the user approaches the access point 24. In this case, the access point 24 may transmit a request message to the cloud computing system 10 such that the processor 14 and the rules engine 16 may ascertain whether the user of the UE 26 is authorized entrance through the access point 24. If so, the processor 14 may generate an access grant, and transfer the access grant to the access point 24 through the network interface 12. Again, the terms "beacon" and "transmit" may be used interchangeably with respect to the device that is performing the communication (e.g., the access point 24 communicating with the cloud computing system 10 or the UE 26 communicating with the cloud computing system 10).

In some embodiments, the rules engine 16 may include and/or be operable as a machine learning engine that is operable to identify a user based on an image obtained via the user's UE 26, For example, the user identifying information included in the database 18 may include an image of the user. Thus, when a user needs to gain access to the access point 24, the user may capture an image of the user's face with the user's UE 26 for transmission to the cloud computing system 10. From there, the rules engine 16 may machine learn the user's face and determine whether it matches the stored image in the user identifying information in the database 18.

In some embodiments, the cloud computing system 10 may substantially automate the user's access to the access point 24. For example, suppose that the property on which the access point 24 is located is a multifamily housing unit. The user being a prospective renter of an apartment in the unit may apply for a lease through the user's UE 26 (e.g., via the Internet). The user, in this regard, may populate an online form of the multifamily housing unit with information (e.g., duration of the lease, background information, financial information, etc.) and then upload that form to the cloud computing system 10. From there, the access point management system 22 (e.g., a property manager) may decide whether to grant the lease to the apartment. If so, the access point management system 22 may then upload the information pertaining to the lease and the user's identifying information to the cloud computing system 10. And, the cloud computing system 10 may issue an access grant for the term of the lease to the user's UE 26 such that the user may access the access point 24 at will.

In some embodiments, the cloud computing system 10 may also automatically transfer messages to the UE 26 of the user to alert the user of various activities. For example, the cloud computing system 10 may determine that the user's lease is about to end within one month. The cloud computing system 10 in this scenario may transfer an alert to the user's UE 26 such that the user may renew the lease or make plans for exiting the property. Alternatively or additionally, the cloud computing system 10 may issue alerts notifying the user of other scenarios such as potential trespassers or criminal activity. For example, the cloud computing system 10 being operable to monitor the access point 24 may detect an unauthorized access to the user's leased apartment. The cloud computing system 10 may then alert authorities (e.g., apartment managers, law enforcement, etc.) and transfer an alert to the user's UE 26 such that the user does not become unwittingly involved in dangerous/criminal activity.

Examples of the beacon 30 include various radio frequency (RF) signaling techniques including near field communications (NFCs), the Bluetooth-based iBeacons produced by Apple, Inc. of Cupertino Calif., Bluetooth access point identifiers, and other forms of Bluetooth Low Energy (BLE) beacons. However, the beacon 30 is not intended to be limited to RF signaling. For example, the access point 24 may include signage that displays a QR code which the user can image via the user's UE 26. The QR code may then cause the transmission of the request to the cloud computing system 10 from the user's UE 26. Thus, transmission may include the display of the QR code.

Based on the foregoing, the cloud computing system 10 is any device, system, software, or combination thereof operable to maintain access points of various access point management systems 22 and to issue access grants (i.e., and denials) to users of the access points 24. The database 18 is any device, system, software, or combination thereof operable to maintain accounts pertaining to access point management systems 22, access points 24 of various properties associated with the accounts, user information, lease information associated with various properties, and the like. The processor 14 is any device, system, software, or combination thereof operable to implement a rules engine 16 that can identify when a user approaches an access point 24, process a request by the user seeking ingress/egress to the access point 24, and either grant or deny access to the user. The access point management system 22 is any device, system, software, or combination thereof operable to communicatively coupled to the administrator 22 establish an account to the cloud computing system 10 and register its access points 24 and users with ingress/egress permissions to the access points 24. The administration system 20 is any device, system, software, or combination thereof operable to maintain the functional aspects of the cloud computing system 10 and manage accounts of the access point management systems 22. The beacon 30 is any device, system, software, or combination thereof operable to link the UE 26 and/or the access point 24 to the cloud computing system 10. Again, examples of the beacon 30 include QR codes, NFCs, RF signaling, Bluetooth access point identifiers, other forms of Bluetooth Low Energy (BLE) beacons, and the like. Examples of the access point 24 include gates, doors, and other barriers to entry that may be electronically/remotely controlled (e.g., via smart locks and the like).

Additionally, the term "lease" is not intended to simply include information pertaining to a resident occupying a property. Rather, the term lease may also include information pertaining to nonresidents requiring access. For example, maintenance personnel, law-enforcement personnel, guests, etc. requiring access to the access point 24 may be maintained in the database 18 as long as those functions are required. To illustrate, a maintenance person may have a lease to a property to provide various services to the property while the maintenance person is employed by a property manager. Accordingly, maintenance person may have a "lease" that establishes the maintenance persons access permissions as required by the property manager. Similarly, a guest may have a lease that grants temporary access to various access points property as determined by a user and/or a property manager.

Figure 3:
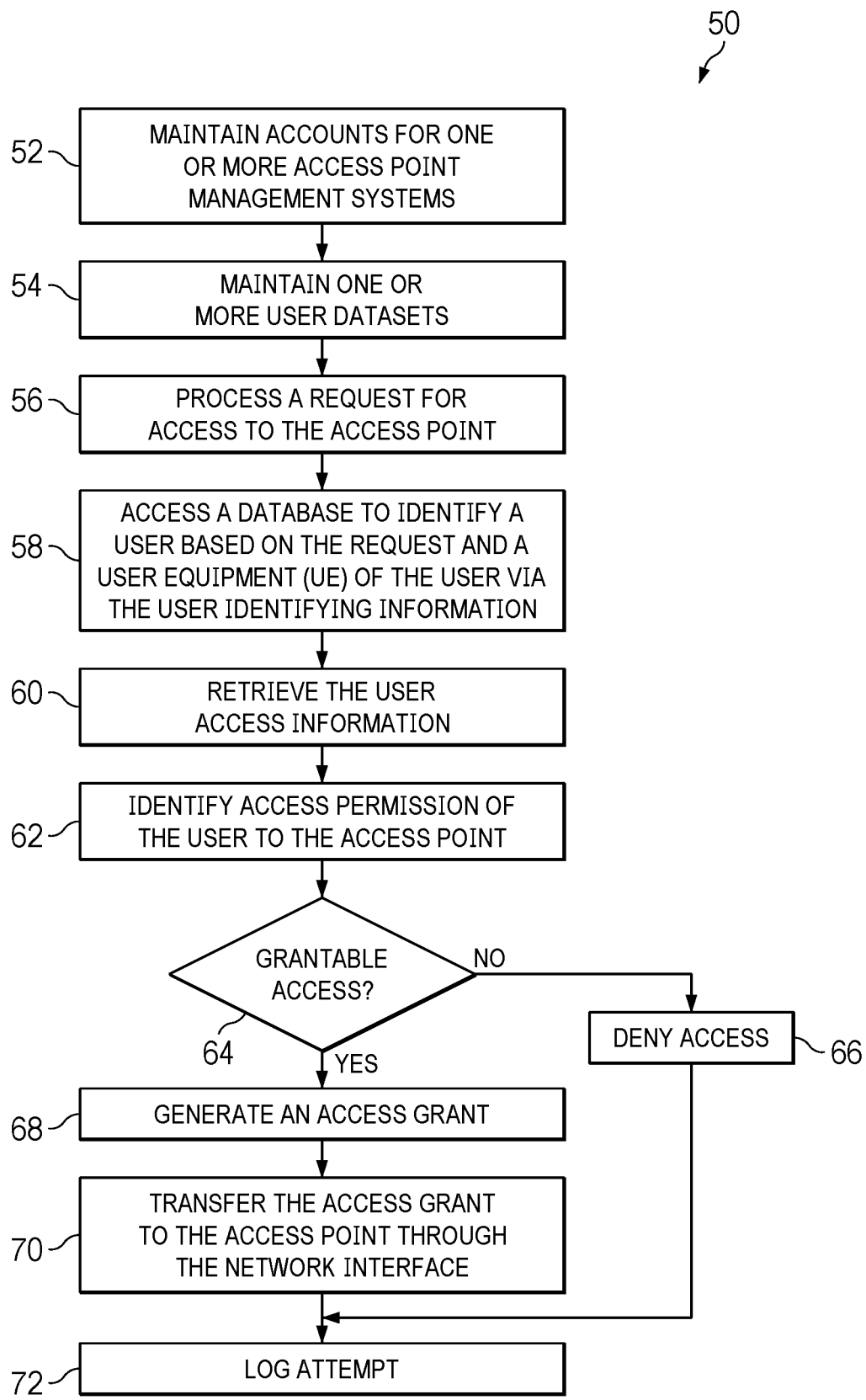
FIG. 3 is a flowchart of an exemplary process of the system of FIG. 1.

FIG. 3 is a flowchart of an exemplary process 50 of the cloud computing system 10 of FIG. 1. In this embodiment, the process 50 initiates when an access point management system 22 registers with the cloud computing system 10. For example, the access point management system 22 may establish an account with the cloud computing system 10 that identifies the access points 24 associated with a property of the access point management system 22. In this regard, the access point management system 22 may also establish the users that may ingress/egress the property through the access points 24. Accordingly, the cloud computing system 10 maintains the accounts of one or more access point management systems 22, in the process element 52.

In this regard, the cloud computing system 10 also maintains a plurality of user data sets that identify users registered with the access point management system 22, in the process element 54. For example, a user may sign a lease for access to a property. A property manager may then input information pertaining to the user's identification (e.g., name, date of birth, personal identification number or "PIN", an image of the user, etc.) as well as information pertaining to the user's lease into the access point management system 22, thereby granting access to the access point 24. The access point management system 22 may then upload the user dataset to the cloud computing system 10 to maintain control of the user's access to the access points 24 associated with the property that the user is leasing.

Thus, when a user wishes to enter the property, the user may approach the access point 24 such that a request may be generated for ingress/egress to the access point 24. In this regard, the processor 14 may process the request for access to the access point 24, in the process element 56. The rules engine 16 may then access the database 18 to identify the user based on the request and the UE 26 in the user's possession via the user identifying information, in the process element 58. For example, the user's UE 26 may receive a beacon from the access point 24 that directs the UE 26 to initiate the request to the cloud computing system 10. The rules engine 16 may use information about the UE 26 as well as the user identifying information in the database 18 to identify the user's identity. Alternatively, the UE 26 may be a preprogrammed fob that the user carries. Thus, when the user approaches the access point 24, the access point 24 may detect the fob and initiate a request for access on behalf of the user.

In some embodiments, the fob may be self-provisioning. For example, a user may configure a fob via an access point having a card reader. With the user's UE, the user may be directed to an application that provides a series of instructions on how to provision their own fob by communicating with the card reader. After confirming the credential of the user's fob, the UE may synchronize the fob with the cloud computing system 10, thereby allowing the user to maintain accesses to various properties via the fob.

In any case, the rules engine 16 may retrieve access information associated with the user, in the process element 60, to identify access permissions of the user to the access point 24 to which the user is seeking ingress/egress, in the process element 62. The rules engine 16 may then determine whether the user is entitled to access to the access point 24, in the process element 64. If not, the mules engine 16 may deny access to the user, in the process element 66, and then log the attempt in an access history file maintained in the database 18, in the process element 72. Otherwise, the rules engine 16 determines that the user is eligible for access to the access point 24, and the processor 14 generates an access grant, in the process element 68. The processor 14 may then transfer the access grant to the access point 24 through the network interface 12, in the process element 70, such that the user can proceed with ingress/egress through the access point 24. This granted access may also be logged in the access history file maintained in the database 18, in the process element 72.

Figure 4:
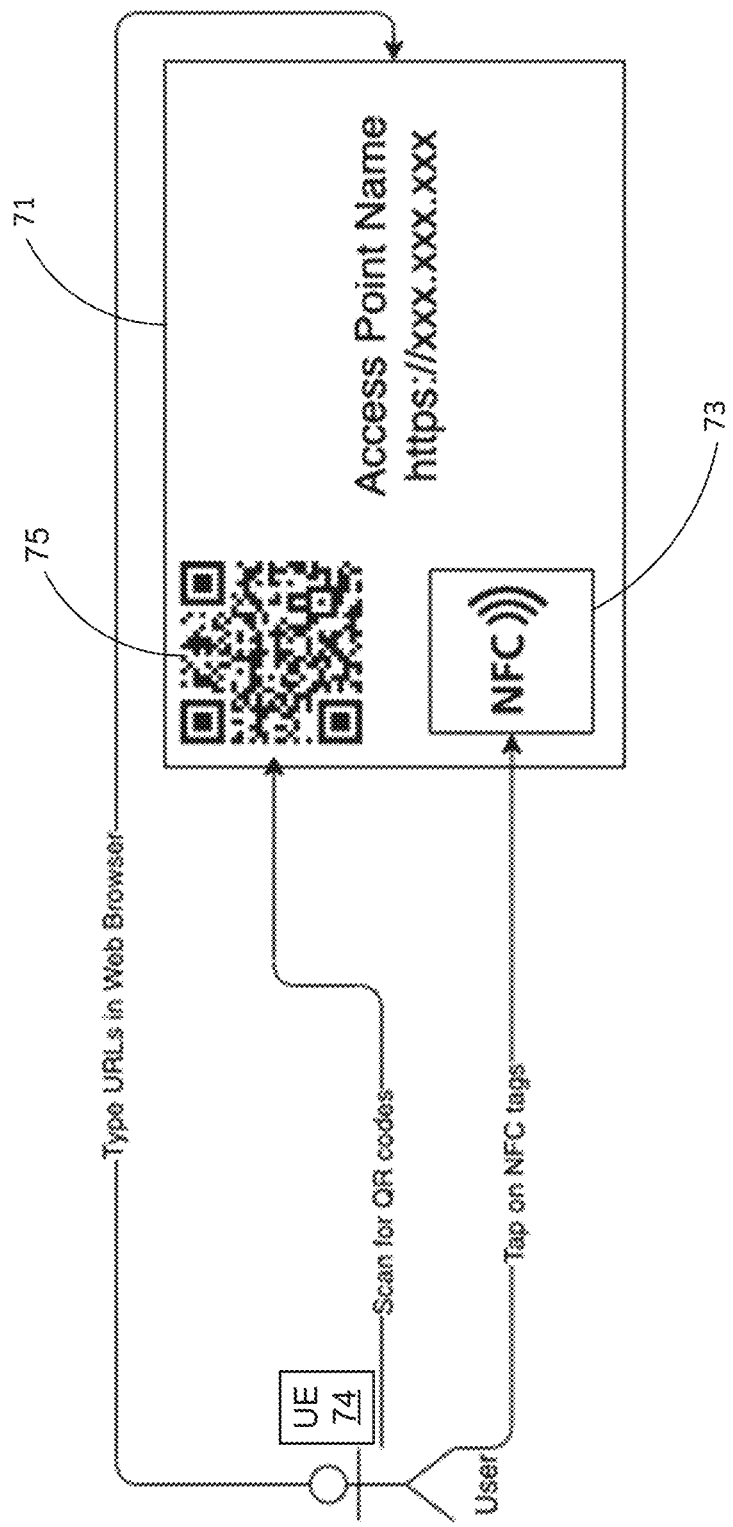
FIG. 4 is a block diagram of an access point that a user may access via a UE.

FIG. 4 is a block diagram of an access point 71 that a user may access via a UE 74. For example, when the user approaches the access point 71, the user may use the UE 74 to scan the QR code 75 as part of signage configured with the access point 71. Alternatively or additionally, the UE 74 may detect a signal from the NFC 73. The user may even type in the URL of the access point 71 in a web browser configured with the UE 74. In any case, the UE 74 may then communicate with the cloud computing system 10 to attempt access to the access point 71. This embodiment allows the user to gain access to the access point 71 without the need for an application being installed on the UEs 74, thereby potentially supporting a wider range of devices.

Figure 5:
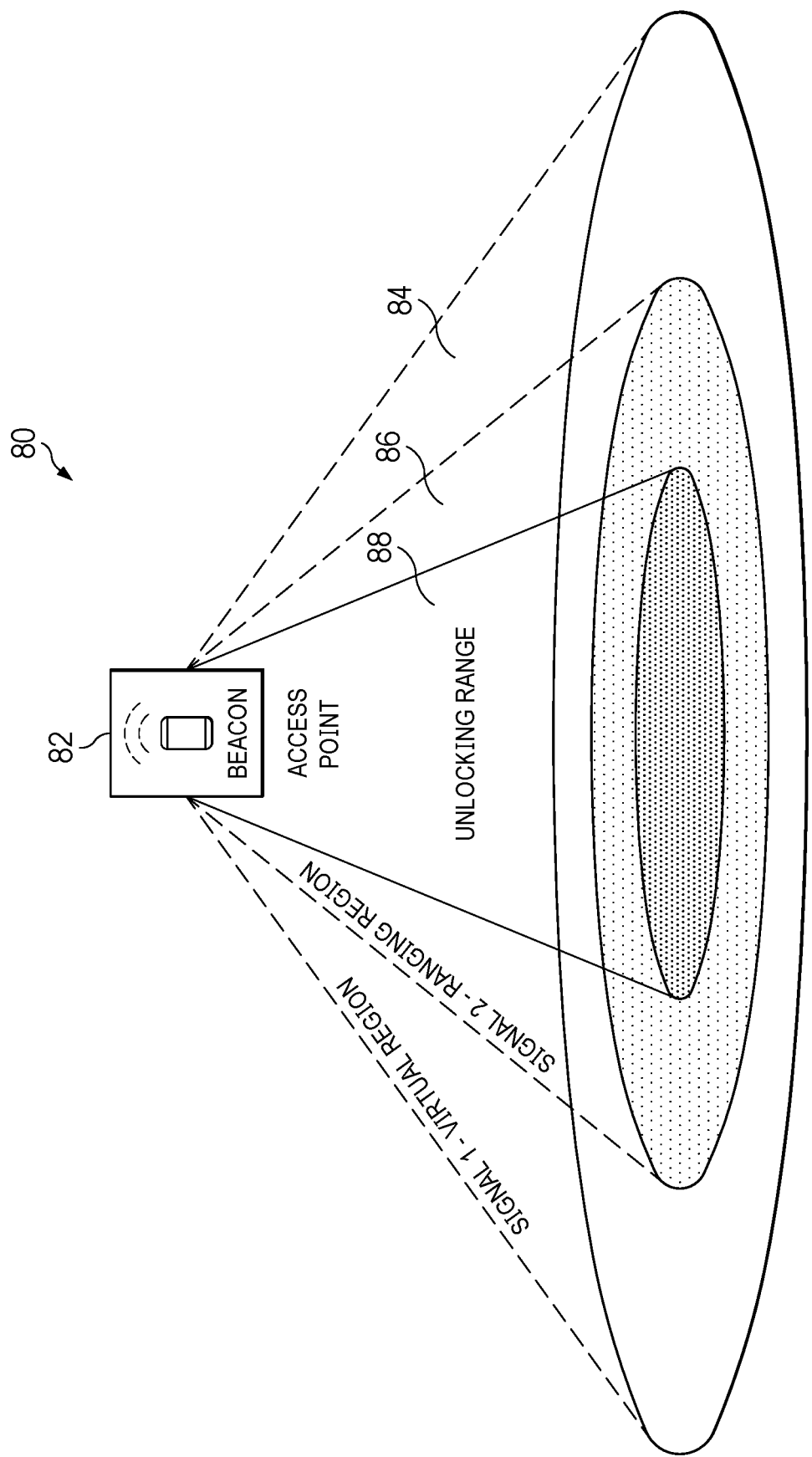
FIG. 5 is a diagram of an exemplary proximity-based sensing.

FIG. 5 is a diagram of an exemplary proximity-based sensing. In this embodiment, an access point 80 illustrates various beacon ranges in which a user can gain access. For example, the access point 80 may comprise a beacon 82 that transmits one or more signals in a plurality of zones 84, 86, and 88. A "virtual region" 84 operates as an identifier of the access point 80. Via an application on the user's UE, the user may opt in to allow the UE to monitor signals from the beacon 82 that established the virtual regions 84 for one or more access points 80. From there, when a user enters a virtual region 84, the signal from the beacon 82 awakens the application such that the UE can scan for additional signals, such as a ranging beacon (i.e., in the region 86) that indicates that the user is about to approach the access point 80. The signal may allow the application to determine the relative distance to the beacon 82. From there, the UE may send a request to the cloud computing system 10 such that the cloud computing system 10 of FIG. 1 can unlock the access point 80 when the user enters the unlocking range 88. This provides the user with uninterrupted ingress/egress access to the access point 80. In other words, once the user's UE is registered with the cloud computing system 10, the user may gain ingress/egress access to the access point 80 with little to no interaction with the mechanisms controlling the access point 80.

Figure 6:
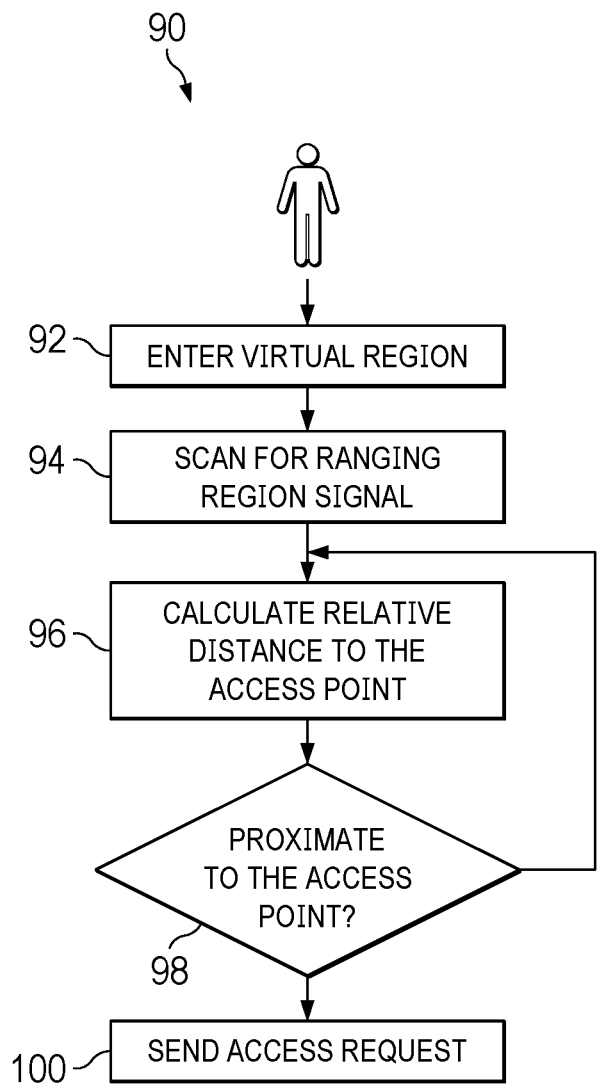
FIG. 6 is a flowchart of an exemplary process operable with the access point of FIG. 5.

FIG. 6 is a flowchart of an exemplary process 90 operable with the access point 80 of FIG. 5. The process 90 may initiate when the user enters the virtual region 84 of the access point 80, in the process element 92. From there, the user's UE begins scanning for the ranging region signal from the beacon 82, in the process element 94. This allows a user's UE to begin calculating the relative distance to the access point 82, in the process element 96, and then determine whether the user is proximate to the access point 82, in the process element 98. Once the user is close to the access point 82, then the user's UE sends an access request to the cloud computing system 10, in the process element 100. Alternatively or additionally, the access point may send a request to the cloud computing system 10. The cloud computing system 10 may then determine whether access to the access point 82 is grantable. And, if so, the cloud computing system 10 issues a grant that provides the user with ingress/egress access to the access point 80.

Figure 7:
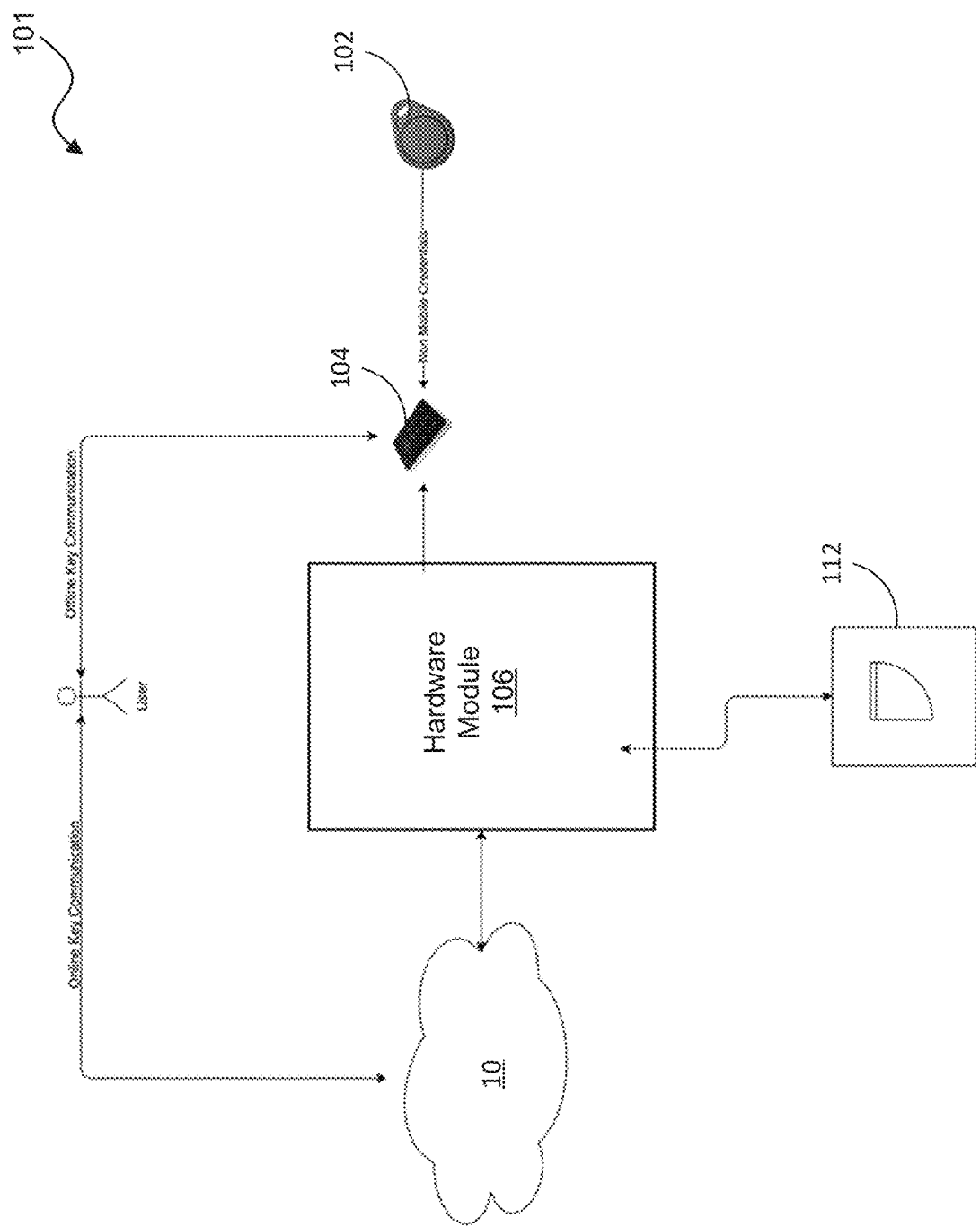
FIG. 7 is a block diagram of another exemplary access point.

FIG. 7 is a block diagram of another exemplary access point 101. In this embodiment, the access point 101 comprises a hardware module 106 configured with an ingress/egress point 112. The hardware module 106 may include a fob reader 104 such that a user may gain ingress/egress access to the point 112. For example, as the user approaches the access point 101, the user may waive the fob 102 proximate to the fob reader 104. The hardware module 106 may then communicate with the cloud computing system 10 of FIG. 1 such that the cloud computing system 10 can determine whether access should be granted to the user at the ingress/egress point 112. Upon determining that the user should be granted access to the ingress/egress point 112, the cloud computing system 10 may issue a grant to the hardware module 106. Alternatively or additionally, the user may directly communicate with the cloud computing system 10 via the user's UE to seek the access grant and then transfer the grant to the hardware module 106.

In some embodiments, the user's UE can also store an "offline key" with the hardware module 106 to communicate directly with the hardware module 106. If, however, the hardware module 106 is offline, the user's UE can communicate directly with the cloud computing system 10 to verify. For example, the hardware module 106 when operational, may synchronize with the cloud computing system 10 such that the user's offline key is also maintained with the cloud computing system 10. Thus, the user's UE may communicate with the cloud computing system 10 to gain access to the access point even though the hardware module 106 is offline or otherwise disabled.

Figure 8:
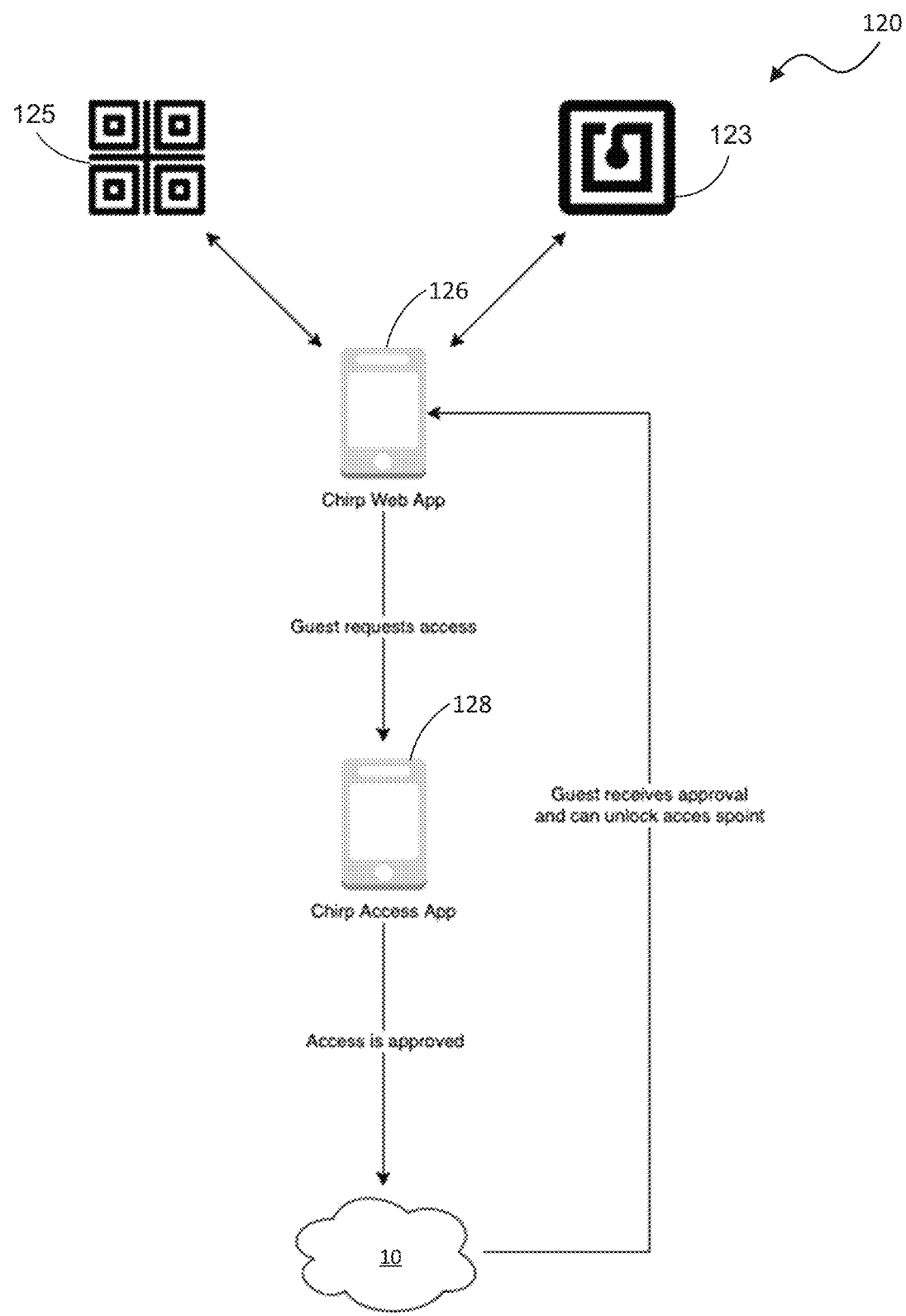
FIG. 8 illustrates an exemplary messaging diagram in which the cloud computing system 10 of FIG. 1 provides guest access determinations.

FIG. 8 illustrates an exemplary messaging diagram 120 in which the cloud computing system 10 of FIG. 1 provides guest access determinations. For example, a user that has grantable access credentials may authorize a guest to the same access points that the user has access to. In one embodiment, the guest may approach an access point with a UE 126. The guest may then use the UE to read signage 123/125 to access an application that interfaces with the cloud computing system 10. Alternatively or additionally, the signage may direct the guest to a website that allows the guest to link to the cloud computing system 10. If the guest is registered by a user with access to the access point, the cloud computing system 10 may then determine whether the guest should be granted access to the access point.

Alternatively or additionally, the guest may contact the user owning the grantable access to the access point. For example, the guest may use the UE 126 to contact the UE 128 of the user that has grantable access. The user with the grantable access may then send a link to the UE 126 granting access to the guest and/or communicate directly with the cloud computing system 10 such that the cloud computing system 10 may grant access to the guest.

In some embodiments, the user with grantable access may authorize a guest in advance of the guest's arrival on a property. For example, a user with grantable access to a property may wish to invite a guest over to the property. In this scenario, the user with the grantable access to the property may initiate a request to the cloud computing system 10 to grant access on behalf of the guest. The cloud computing system 10 may then transfer a "guest pass" to the guest's UE 126 (e.g., designating the various access points of the property that the guest may access, the duration of access, etc.). Thus, when the guest arrives, the guest may access the property via the access point using any one of the methods described herein. In some embodiments, the duration of access may be extended by the user. For example, if the user wishes that the guest stay for an additional period of time, the user can contact the cloud computing system 10 to extend the duration of the guest on the property.

Figure 9:
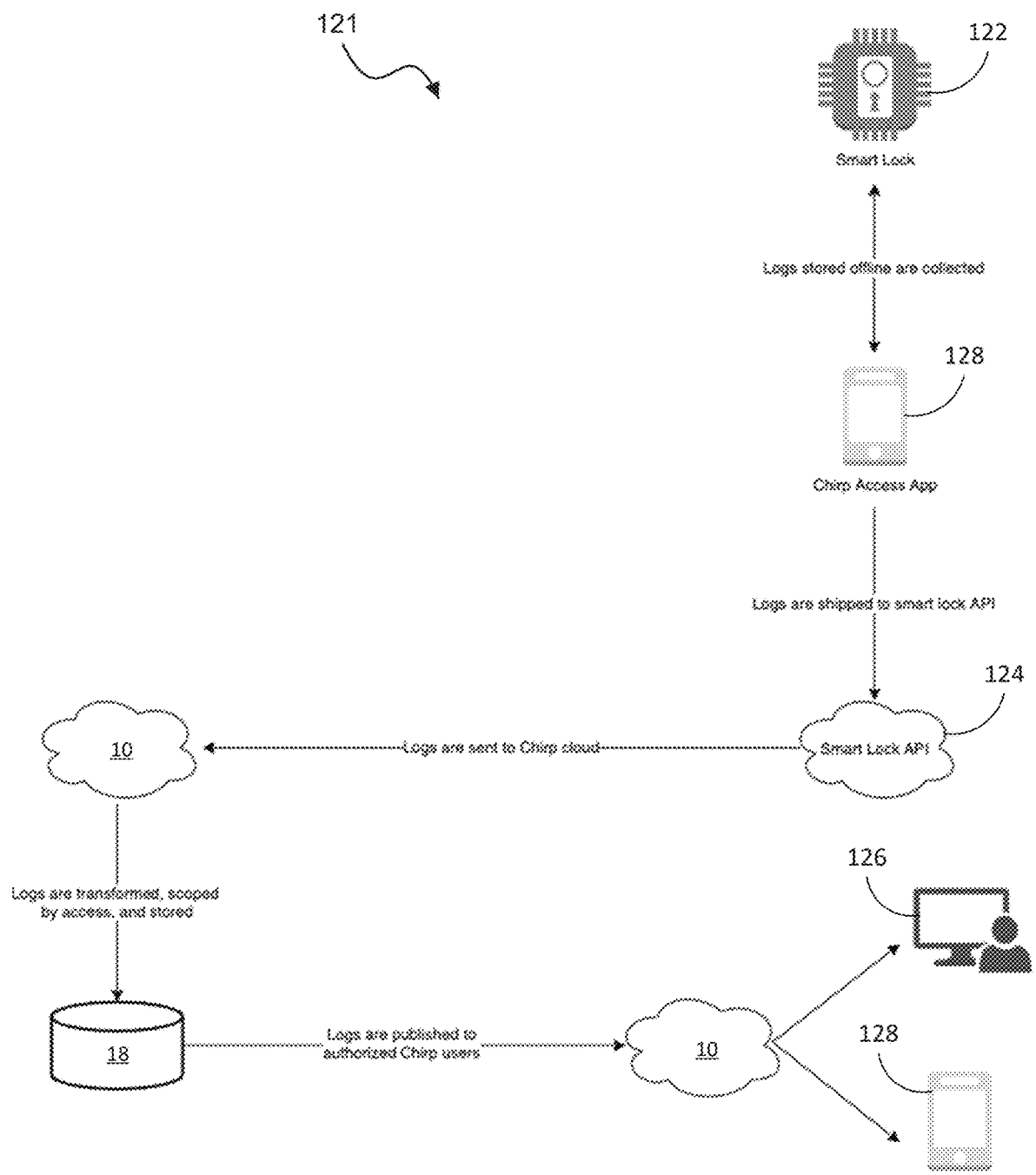
FIG. 9 is a block diagram of an exemplary smart lock log synchronization system that may be used with a multifamily housing property.

FIG. 9 is a block diagram of an exemplary smart lock log synchronization system 121 that may be used with a multifamily housing property. In this embodiment, the cloud computing system 10 is communicatively coupled to a smart lock 122 securing an access point of the property (e.g., an individual apartment unit). The cloud computing system 10 is operable to maintain logs associated with ingress and egress of access points to the property. example, when a user attempts to unlock the smart lock 122 at an access point, the user's UE 128 may transfer log information to a smart lock application programming interface (API) 124 associated with the cloud computing system 10. Alternatively or additionally, the smart lock 122 itself may log the access attempt and transfer that log information directly to the cloud computing system 10. From there, the cloud computing system 10 may parse out various forms of information such as the type of access, the time of access, the user access, etc. and store the information in the database 18 of the cloud computing system 10.

The cloud computing system 10 may then transfer the logs to authorized users of the access point on the property. For example, if the user having access to the property wishes to view the attempt at ingress/egress to the access point where the smart lock 122 is located, the user may access that log information from the database 18 from the cloud computing system 10. This may allow the user to determine whether unauthorized accesses were attempted to the user's property (e.g., the apartment unit in the apartment complex).

Alternatively or additionally, the property manager of the multifamily housing property may view this log information of attempts made to gain access via the smart lock 122. For example, suppose that the user is no longer authorized access to any portion of the multifamily housing property (e.g., through terms of the lease, eviction, etc.). The property manager through a UE 126 (e.g., an access point management system 22 as illustrated in FIG. 1) may access log attempts made by the former resident of the multifamily housing property. These logs may be used for law enforcement and/or other suitable purposes.

Figure 10:
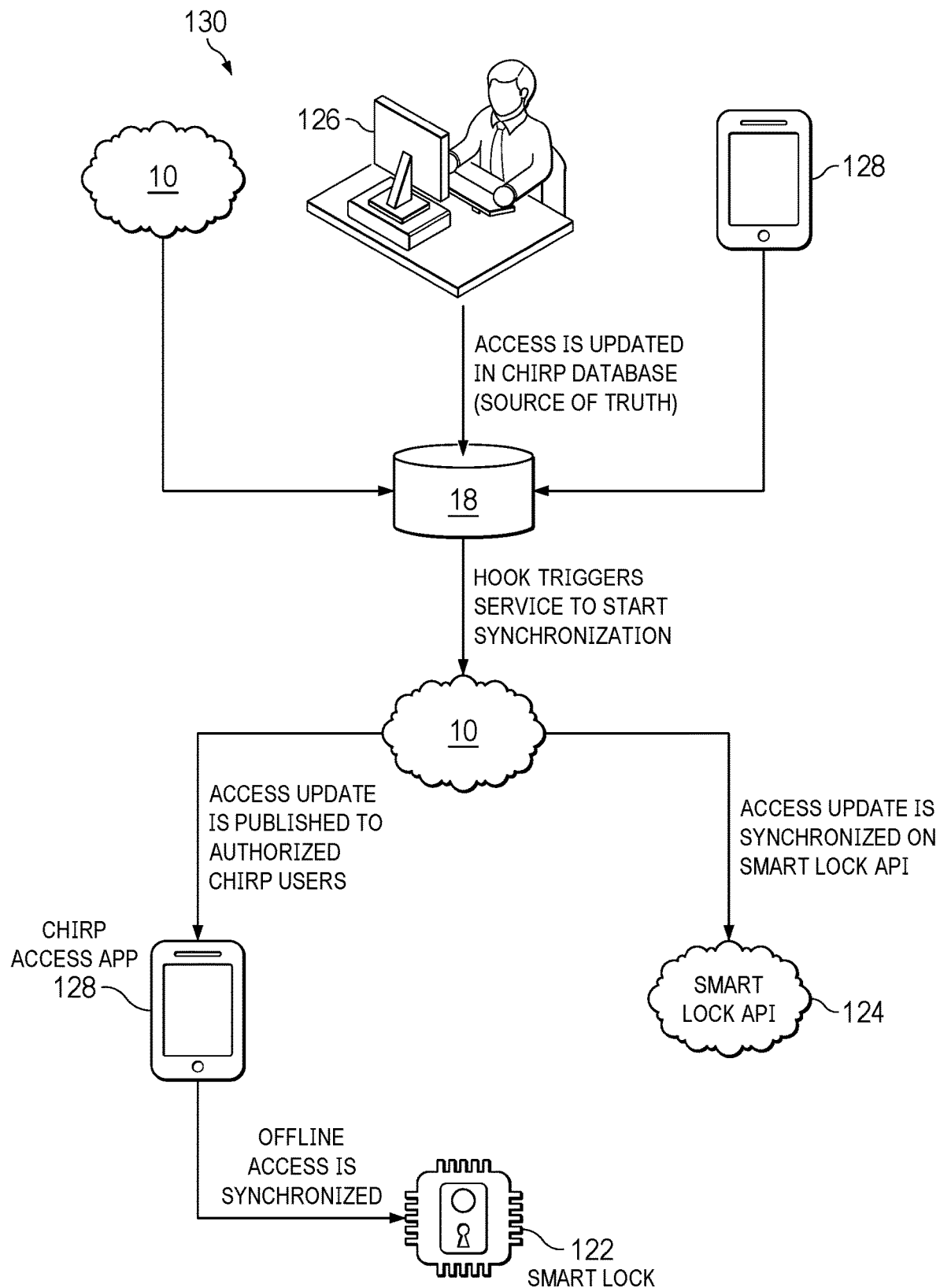
FIG. 10 is a block diagram of an exemplary system for synchronizing smart locks associated with a property.

FIG. 10 is a block diagram of an exemplary system 130 for synchronizing smart locks (e.g., the smart lock 122) associated with a property with a user's UE 128, a UE 126 (e.g., an access point management system 22 as illustrated in FIG. 1), and the cloud computing system 10. For example, in a single-family housing unit, smart lock access may be granted by those with direct access to the smart lock itself (e.g., the owners of the property). Integrating an API of the smart lock into an access control for a multifamily housing unit may be more challenging. Access control should be manageable by multiple users with indirect access to the smart lock. To illustrate, property managers may not have unfettered access to an apartment unit's smart lock that a resident may have. But, the property manager may need to be able to grant access to various parties (e.g., staff, law enforcement, etc.) to fulfill certain functions.

To overcome the limitations of access control for smart locks in a multifamily context, a cloud computing system 10 may employ "hook based synchronization". Hook based synchronization allows the database 18 of the cloud computing system 10 to act as a source of truth for the property in granting access to various access points on the property (e.g., the access point 24 of FIG. 1). Thus, users with roles pertaining to property management may have the authority to manage direct access to a particular smart lock 122 (e.g., via the UE 126). This direct access may then be synchronized with the smart lock 122 via the cloud computing system 10 such that the smart lock 122 may be controlled by the property manager via the UE 126.

To illustrate, hooks may be operational to establish event handlers in the cloud computing system 10. For example, once access credentials are created, updated, and/or deleted for a user, an event handler may send a "webhook" notification to a uniform resource locator (URL) of the cloud computing system 10 where the event will be handled accordingly, thereby synchronizing access to the smart lock 122. In some embodiments, accesses can be updated from multiple origins (e.g., via the access point management system 22 and/or the admin system 20). Because the database 18 acts as the source of truth, access may be synchronized immediately, regardless of origin, as determined by the rules engine 16.

After the access is created and/or updated in the database 18 of the cloud computing system 10, a "hook" may automatically trigger a service that starts synchronization of the smart lock 122 via a smart lock API 124. As the database 18 is the source of truth, unauthorized users and their various/previous means of entrance through the smart lock 122 (e.g., pin codes, keys, etc.) may be deauthorized. Then, the property manager may enter the authorized users into the database 18 via the UE 126 and assume control of the smart lock API 124.

For example, the hook may also trigger a real-time publication of the access update to any authorized users. For example, the cloud computing system may alert the user's UE 128 that the user is now unauthorized access to the smart lock 122. After the synchronization is complete, access via the smart lock API 124 of the smart lock 122 may be disabled such that only access grants may be authorized via the cloud computing system 10.

Figure 11:
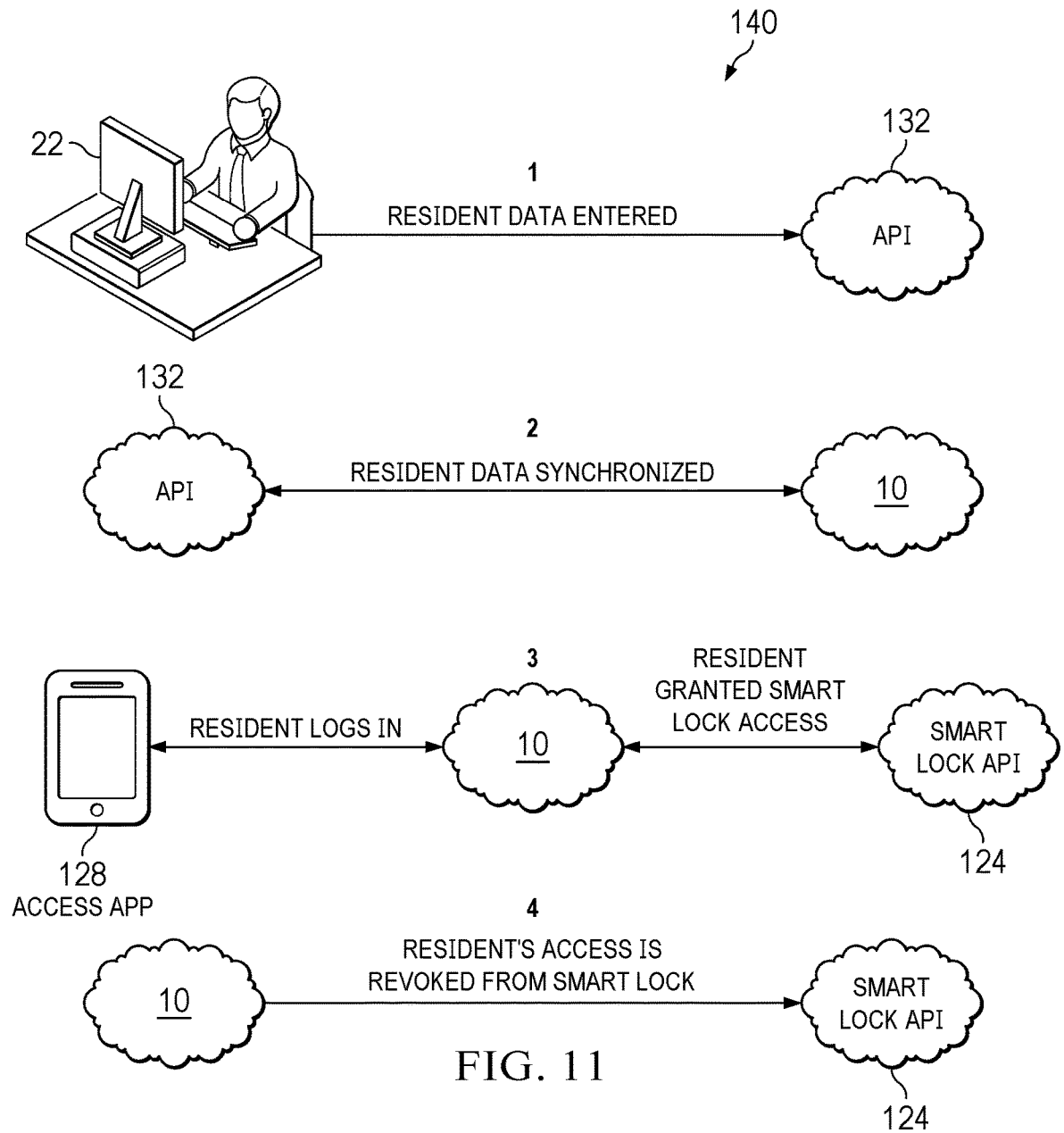
FIG. 11 illustrates an exemplary flow diagram of automated access control to a property.

FIG. 11 illustrates an exemplary flow diagram 140 of automated access control to a property. In this embodiment, access point management is integrated with smart lock solutions to automate access control for residents of the property. For example, when a user signs a lease with a property, a property manager via the access point management system 22 (e.g., from FIG. 1) enters the user's lease information into the database 18 of the cloud computing system 10 via an API 132 of the administration system 20. The API 132 may then communicatively couple with the cloud computing system 10 to synchronize the resident data with the access point management system 22. Thus, once the user logs in through the user's UE 128, the UE 128 communicates with the cloud computing system 10. And, the cloud computing system 10 may then grant access to the smart lock API 124 of the associated smart lock 122. When the lease is complete, the cloud computing system 10 revokes the user's access such that the user can no longer log into the smart lock API 124 via the user's UE 128.

In one embodiment, the API 132 is operable to interact with the access point management system 22 via proprietary property management software operable with the access point management system 22. Thus, a property manager can continue to use the management software such that the cloud computing system 10 is transparent to the access point management system 22. The synchronization of the information with the cloud computing system 10 may occur as background task that pulls the data from the API 132 and imports it into the cloud computing system 10. However, the access point management system 22 may also be able to synchronize information "on demand".

Figure 12:
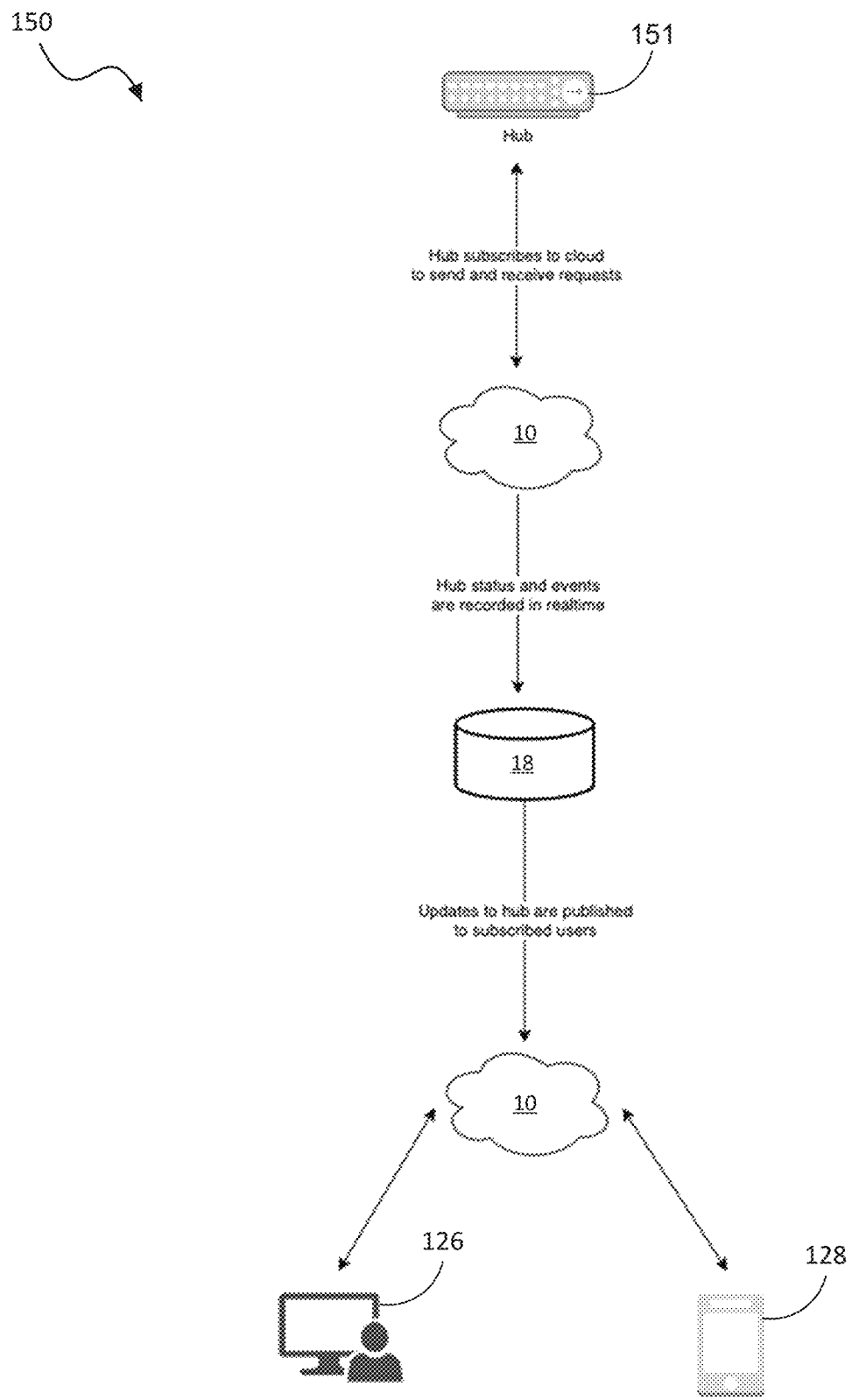
FIG. 12 is a block diagram of an exemplary "hub-based" system being employed with the cloud computing system.

FIG. 12 is a block diagram of an exemplary "hub-based" system 150 being employed with the cloud computing system 10. For example, the system 150 may include a hub 151 that subscribes to the cloud computing system 10 to send and receive various requests. In one embodiment, the hub 151 is a hardware device in charge of locking and unlocking a property's access points as a sort of failsafe in case a locking feature of the access point becomes inoperable. To illustrate, assume that the cloud computing system 10 becomes communicatively decoupled from an access point (e.g., Internet outage, power outage, etc.). An authorized user may still gain access by using a fob. In other words, the hub 151 may be communicatively coupled to the cloud computing system 10 during normal operations. However, when the cloud computing system 10 becomes disabled and/or decouples from the access point to which the user desires access, the hub 151 may grant the user access via a fob device. And, as the hub 151 is typically communicatively coupled to the cloud computing system 10, certain credentials of the user may be pulled from the cloud computing system by the hub 151 and retained by the hub 151. When these credentials need to be revoked, the property manager may terminate the credentials via the access point management system, effectively removing them from the hub 151 when the cloud computing system 10 synchronizes with the hub 151.

In some embodiments, the hub 151 may employ a reverse tunneling system that opens a secure connection with a remote server. A firewall may protect each hub 151 and allow direct access to the hub 151 by white listed IP addresses through the secure tunnel.

The various systems and methods herein may be employed in a variety of ways as a matter of design choice. For example, while the illustrated systems and methods provide certain advantages for authorizing access to access points within multifamily property housings, the embodiments herein are not intended to be so limited. Rather, the access authorizations shown and described above may be implemented with a variety of other types of leasing arrangements including auto leasing, hotels, single-family dwellings, and the like.

Figure 13:
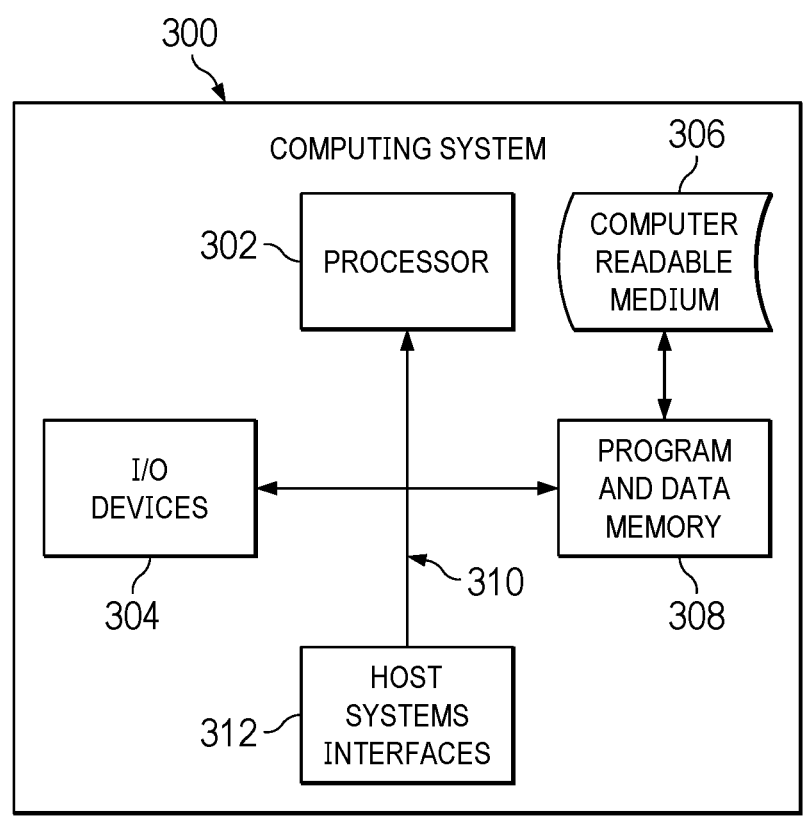
FIG. 13 is a block diagram of an exemplary computing system in which a computer readable medium provides instructions for performing methods herein.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 13 illustrates a computing system 300 in which a computer readable medium 306 may provide instructions for performing any of the methods disclosed herein.

Furthermore, the embodiments can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:
1. A method, comprising:
processing a request for access to an access point by a user equipment (UE) of a first user, the request including information obtained by the UE of the first user from a beacon associated with the access point;
  wherein the beacon is located at the access point; and
    wherein the information is obtained from the beacon by the UE of the first user at the access point;
  identifying the access point based on the information obtained from the beacon by the UE of the first user, at the access point;
  and
  communicating an access grant to the UE of the first user after identifying the access point based on the information obtained from the beacon, by the UE of the first user, at the access point;
    wherein the access grant enables the first user to ingress or egress through the access point.

2. The method of claim 1, further comprising accessing a database to identify the first user based on the request and the UE of the first user;
  wherein the database maintains accounts for a plurality of user datasets; and
  wherein the plurality of user datasets includes user identifying information and user access information to the access point.

3. The method of claim 1, further comprising:
  processing an alternate request for access to the access point by a user equipment (UE) of a second user, the alternate request including information obtained by the UE of the second user from the beacon associated with the access point;
    wherein the information is obtained from the beacon by the UE of the second user at the access point;
  and
  identifying the access point based on the information obtained from the beacon by the UE of the second user, at the access point.

4. The method of claim 3, further comprising:
  denying access after identifying the access point based on the information obtained from the beacon by the UE of the second user, at the access point.

5. The method of claim 4, further comprising:
  accessing a database to identify the first user based on the request and the UE of the first user, wherein the database maintains accounts for a plurality of user datasets, and wherein the plurality of user datasets includes user identifying information and user access information to the access point;
  and
  accessing the database to identify the second user based on the alternate request and the UE of the second user, wherein a user dataset of the plurality of user datasets includes a term in which the second user is allowed access to the access point.

6. The method of claim 5, wherein access is denied in response to a determination that the term has ended.

7. The method of claim 3,
  wherein the beacon includes a Quick Response (QR) code;
  wherein the request includes an imaging of the QR code by the UE of the first user; and
  wherein the alternate request includes an imaging of the QR code by the UE of the second user.

8. The method of claim 1, further comprising:
  communicating the access grant from the UE of the first user to the access point.

9. The method of claim 1, wherein the beacon includes a Quick Response (QR) code, and the information is at least partially obtained via imaging of the QR code by the UE of the first user.

10. The method of claim 1, wherein the beacon includes a source for a Near Field Communications (NFC) signal, and the information is at least partially obtained via detection of the NFC signal by the UE of the first user.

11. The method of claim 1, wherein the beacon includes a source for a Bluetooth signal, and the information is at least partially obtained via detection of the Bluetooth signal by the UE of the first user.

12. A non-transitory computer readable medium having stored thereon a plurality of instructions, wherein the instructions are executed with at least one processor so that the following steps are executed:
  processing a request for access to an access point by a user equipment (UE) of a first user, the request including information obtained by the UE of the first user from a beacon associated with the access point;
    wherein the beacon is located at the access point; and
    wherein the information is obtained from the beacon by the UE of the first user at the access point;
  identifying the access point based on the information obtained from the beacon by the UE of the first user, at the access point;
  and
  communicating an access grant to the UE of the first user after identifying the access point based on the information obtained from the beacon, by the UE of the first user, at the access point;
    wherein the access grant enables the first user to ingress or egress through the access point.

13. The non-transitory computer readable medium of claim 12, wherein the instructions are executed so that the following step is also executed:
  accessing a database to identify the first user based on the request and the UE of the first user;
  wherein the database maintains accounts for a plurality of user datasets; and
  wherein the plurality of user datasets includes user identifying information and user access information to the access point.

14. The non-transitory computer readable medium of claim 12, wherein the instructions are executed so that the following steps are also executed:
  processing an alternate request for access to the access point by a user equipment (UE) of a second user, the alternate request including information obtained by the UE of the second user from the beacon associated with the access point;
    wherein the information is obtained from the beacon by the UE of the second user at the access point;
  and
  identifying the access point based on the information obtained from the beacon by the UE of the second user, at the access point.

15. The non-transitory computer readable medium of claim 14, wherein the instructions are executed so that the following step is also executed:
  denying access after identifying the access point based on the information obtained from the beacon by the UE of the second user, at the access point.

16. The non-transitory computer readable medium of claim 15, wherein the instructions are executed so that the following steps are also executed:

accessing a database to identify the first user based on the request and the UE of the first user, wherein the database maintains accounts for a plurality of user datasets, and wherein the plurality of user datasets includes user identifying information and user access information to the access point;

accessing the database to identify the second user based on the alternate request and the UE of the second user, wherein a user dataset of the plurality of user datasets includes a term in which the second user is allowed access to the access point.

17. The non-transitory computer readable medium of claim 16, wherein access is denied in response to a determination that the term has ended.

18. The non-transitory computer readable medium of claim 14, wherein the beacon includes a Quick Response (QR) code;
wherein the request includes an imaging of the QR code by the UE of the first user; and
wherein the alternate request includes an imaging of the QR code by the UE of the second user.

19. The non-transitory computer readable medium of claim 12, wherein the instructions are executed so that the following step is also executed:
communicating the access grant from the UE of the first user to the access point.

20. The non-transitory computer readable medium of claim 12, wherein the beacon is, or includes a Quick Response (QR) code, and the information is at least partially obtained via imaging of the QR code by the UE of the first user.

21. The non-transitory computer readable medium of claim 12, wherein the beacon includes a source for a Near Field Communications (NFC) signal, and the information is at least partially obtained via detection of the NFC signal by the UE of the first user.

22. The non-transitory computer readable medium of claim 12, wherein the beacon includes a source for a Bluetooth signal, and the information is at least partially obtained via detection of the Bluetooth signal by the UE of the first user.

23. A system, comprising:
an access point, the access point comprising a beacon;
wherein the beacon is located at the access point;
a database, the database maintaining accounts for a plurality of user datasets, the plurality of user datasets including user identifying information and user access information to the access point;
and
a non-transitory computer readable medium having stored thereon a plurality of instructions, wherein the instructions are executed with at least one processor so that the following steps are executed:
processing a request for access to the access point by a user equipment (UE) of a first user, the request including information obtained by the UE of the first user from the beacon;
wherein the information is obtained from the beacon by the UE of the first user at the access point;
accessing the database to identify the first user based on the request and the UE of the first user;

identifying the access point based on the information obtained by the UE of the first user, at the access point;
and
communicating an access grant to the UE of the first user after identifying the access point based on the information obtained from the beacon, by the UE of the first user, at the access point;
wherein the access grant enables the first user to ingress or egress through the access point.

24. The system of claim 23, wherein the instructions are executed so that the following steps are also executed:
processing an alternate request for access to the access point by a user equipment (UE) of a second user, the alternate request including information obtained by the UE of the second user from the beacon;
wherein the information is obtained from the beacon by the UE of the second user at the access point;
and
identifying the access point based on the information obtained from the beacon by the UE of the second user, at the access point.

25. The system of claim 24, wherein the instructions are executed so that the following step is also executed:
denying access after identifying the access point based on the information obtained from the beacon by the UE of the second user, at the access point.

26. The system of claim 24, wherein the instructions are executed so that the following step is also executed:
accessing the database to identify the second user based on the alternate request and the UE of the second user;
wherein a user dataset of the plurality of user datasets includes a term in which the second user is allowed access to the access point.

27. The system of claim 26, wherein access is denied in response to a determination that the term has ended.

28. The system of claim 24,
wherein the beacon is, or includes a Quick Response (QR) code;
wherein the request includes an imaging of the QR code by the UE of the first user; and
wherein the alternate request includes an imaging of the QR code by the UE of the second user.

29. The system of claim 23, wherein the instructions are executed so that the following step is also executed:
communicating the access grant from the UE of the first user to the access point.

30. The system of claim 23, wherein:
the beacon includes a Quick Response (QR) code; and
the information is at least partially obtained via imaging of the QR code by the UE of the first user.

31. The system of claim 23, wherein:
the beacon includes a source for a Near Field Communications (NFC) signal; and
the information is at least partially obtained via detection of the NFC signal by the UE of the first user.

32. The system of claim 23, wherein:
the beacon includes a source for a Bluetooth signal; and
the information is at least partially obtained via detection of the Bluetooth signal by the UE of the first user.

* * * * *

UNITED STATES PATENT AND TRADEMARK OFFICE
CERTIFICATE OF CORRECTION

| | | |
|---|---|---|
| PATENT NO. | : 11,922,747 B2 | Page 1 of 1 |
| APPLICATION NO. | : 17/933550 | |
| DATED | : March 5, 2024 | |
| INVENTOR(S) | : Matthew Hager et al. | |

It is certified that error appears in the above-identified patent and that said Letters Patent is hereby corrected as shown below:

In the Claims

Column 15, Line 28, delete "is, or" after -- the beacon --.

Column 16, Line 38, delete "is, or" after -- the beacon --.

Signed and Sealed this
Twentieth Day of August, 2024

Katherine Kelly Vidal
Director of the United States Patent and Trademark Office